Oct. 28, 1941.  W. T. B. ROBERTS  2,260,483
TRIMMING MACHINE
Filed June 4, 1940  7 Sheets-Sheet 3
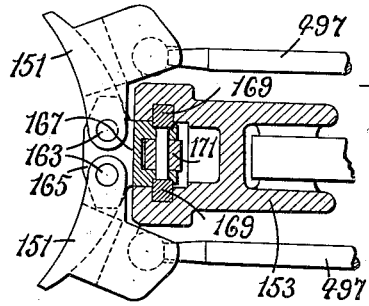
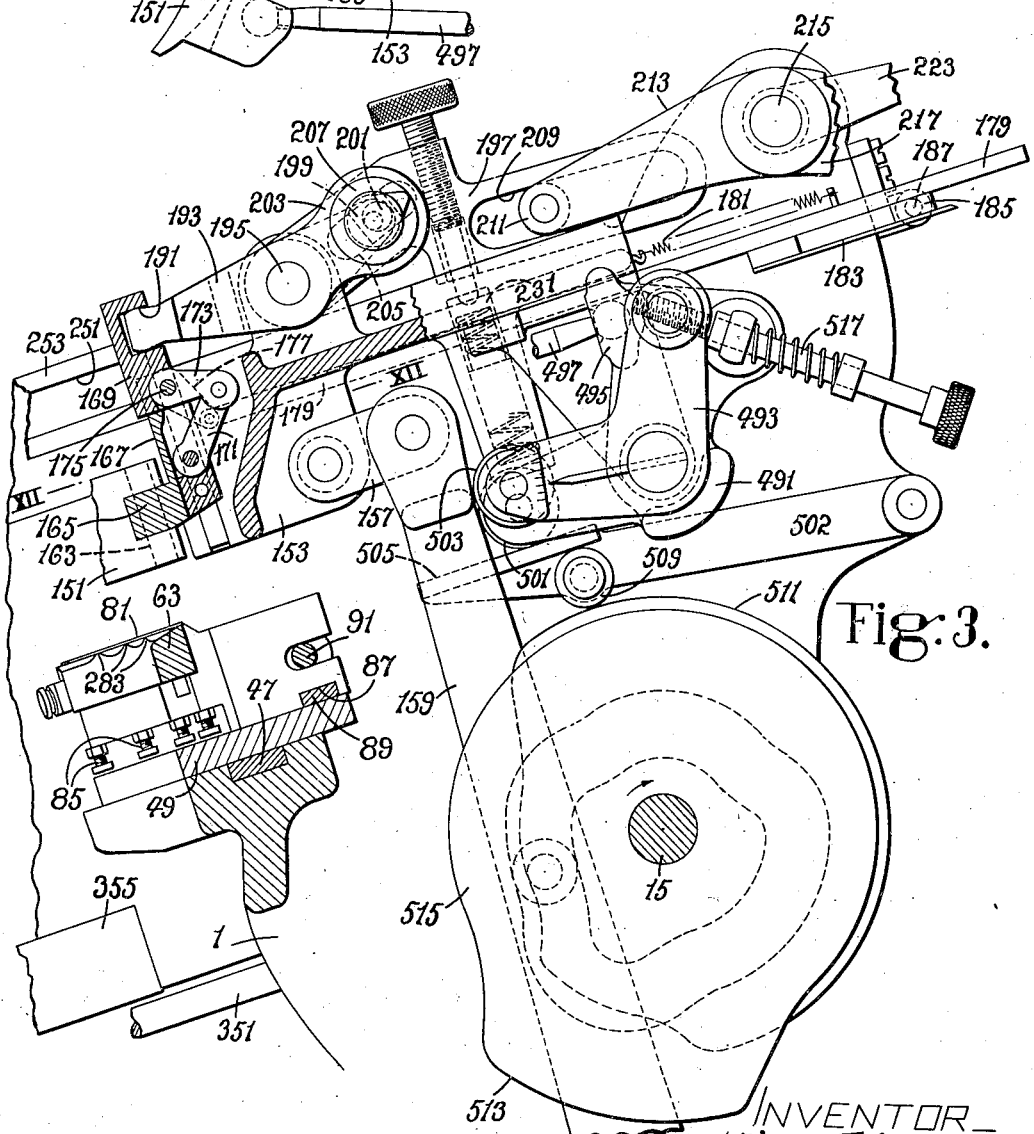
INVENTOR
William T. B. Roberts
By his Attorney

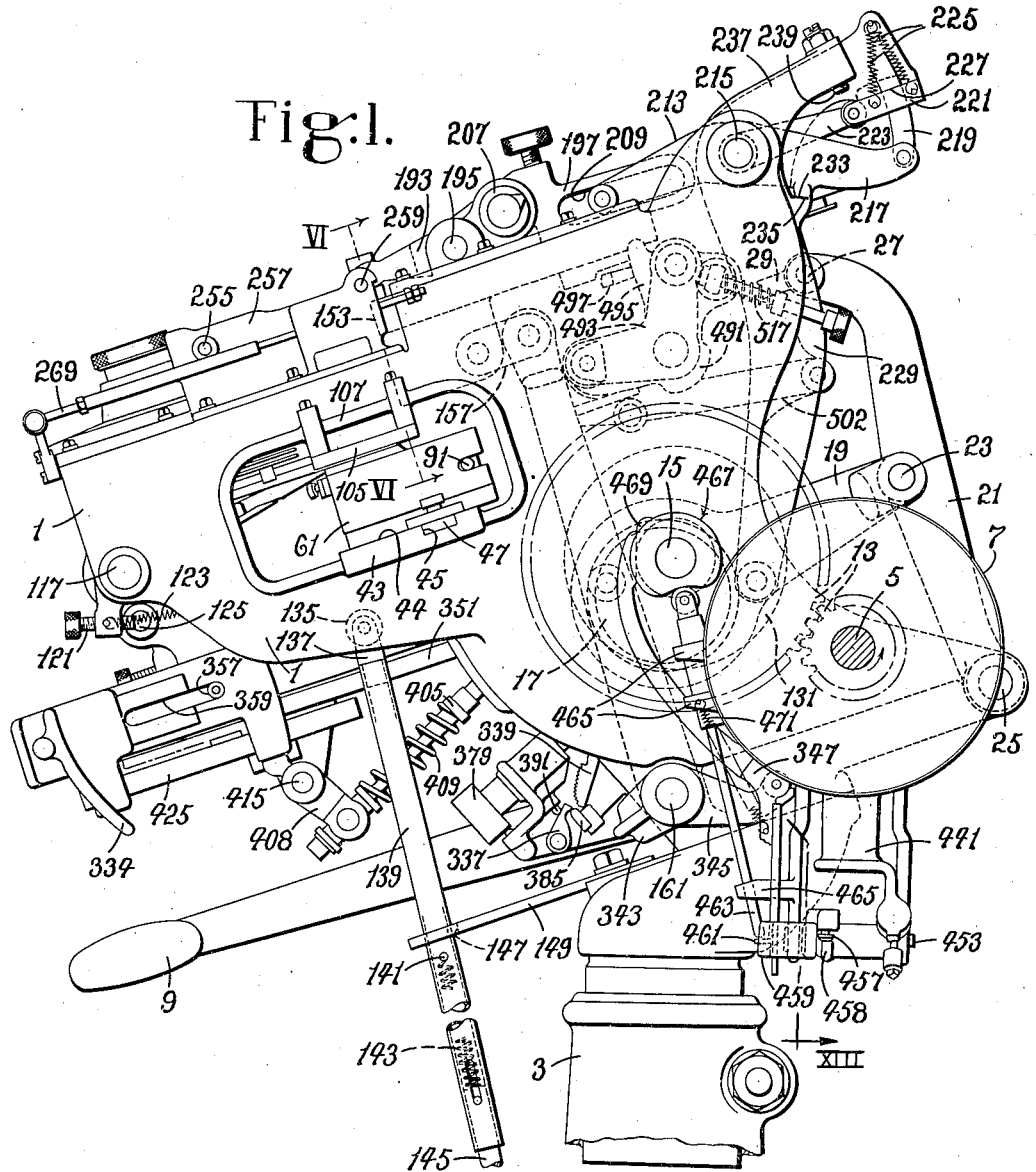

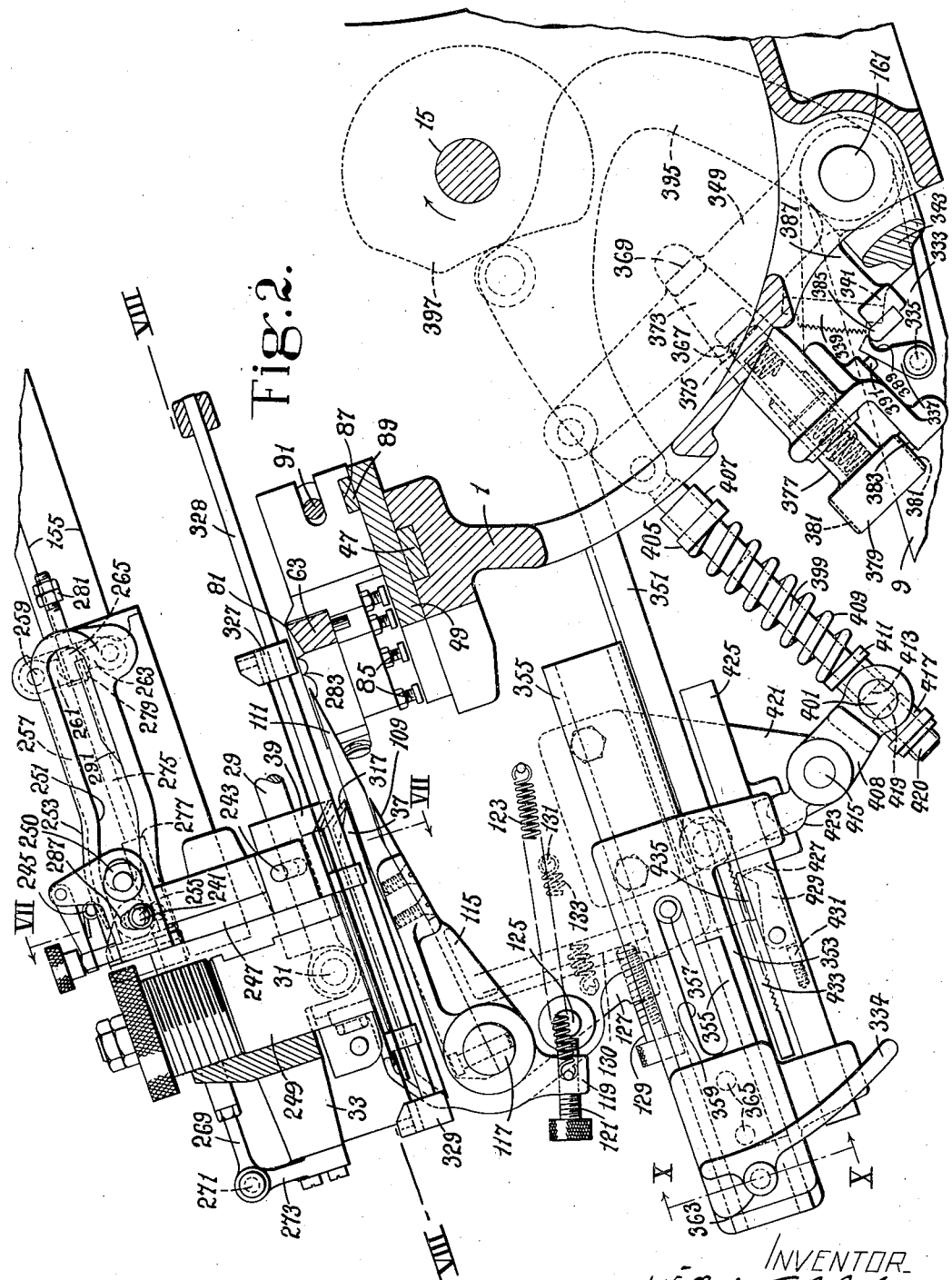

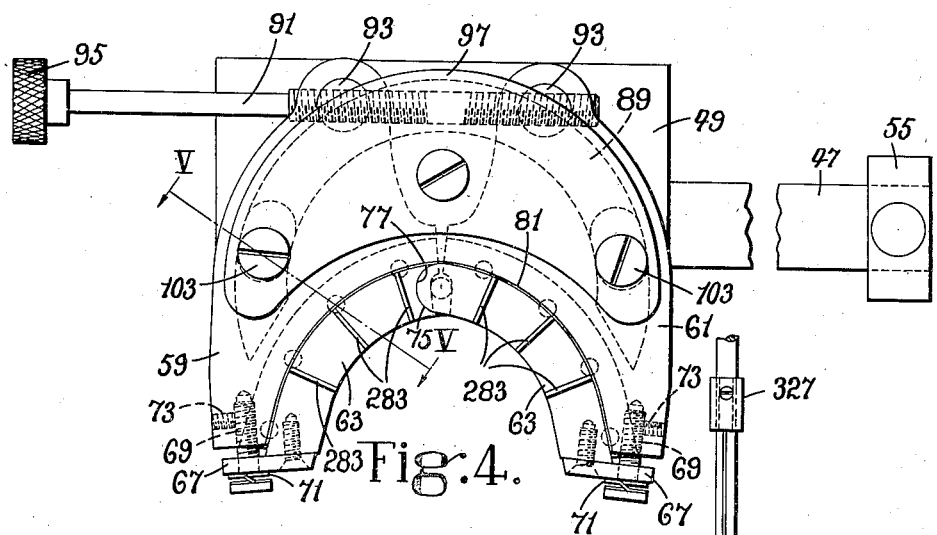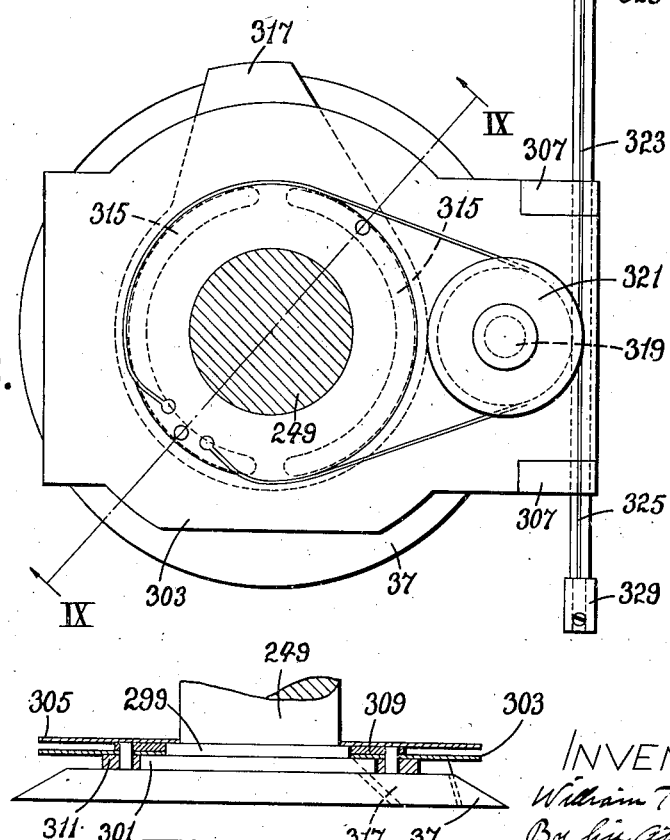

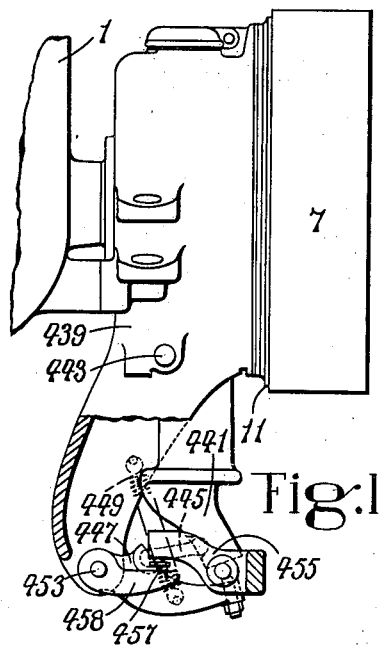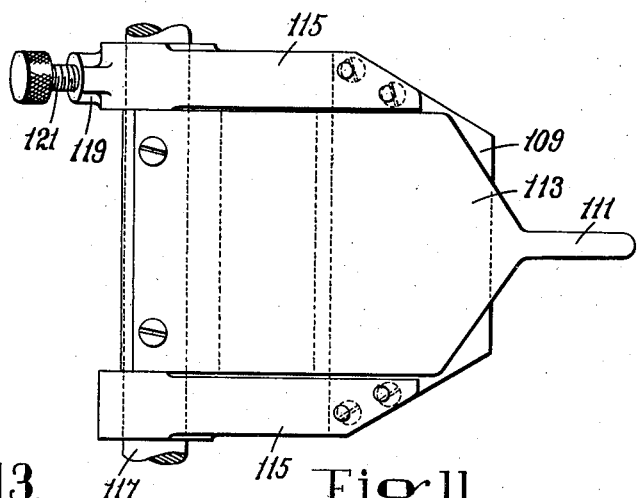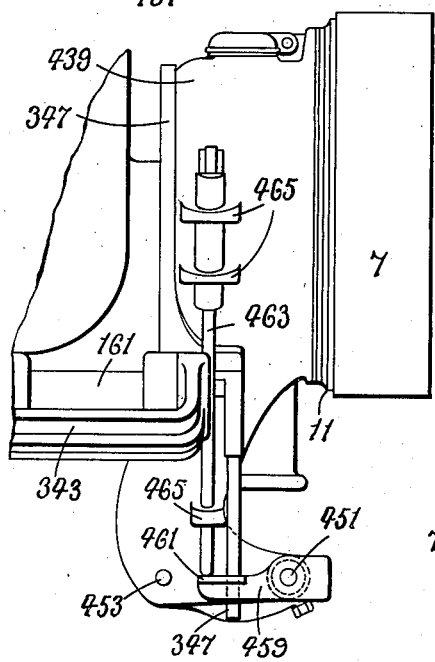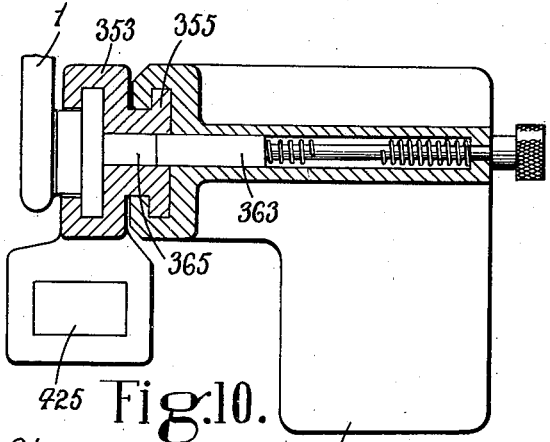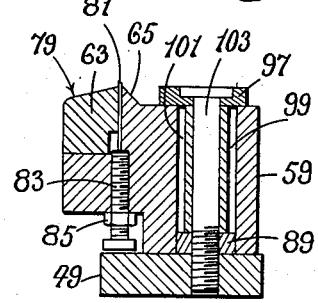

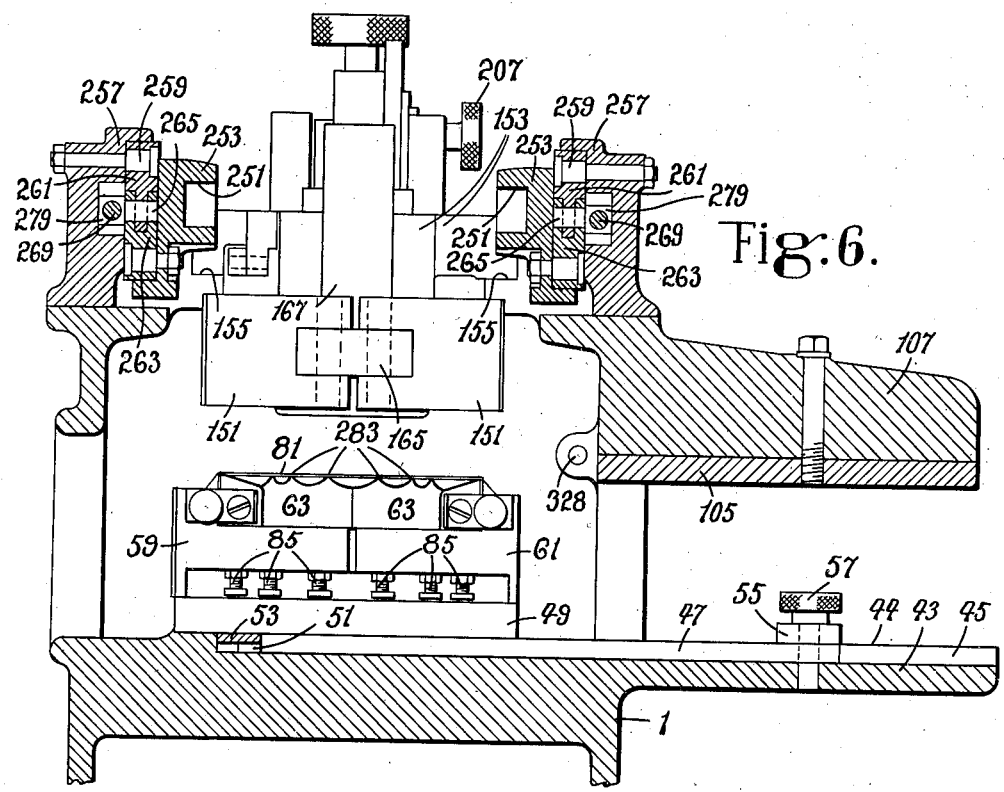
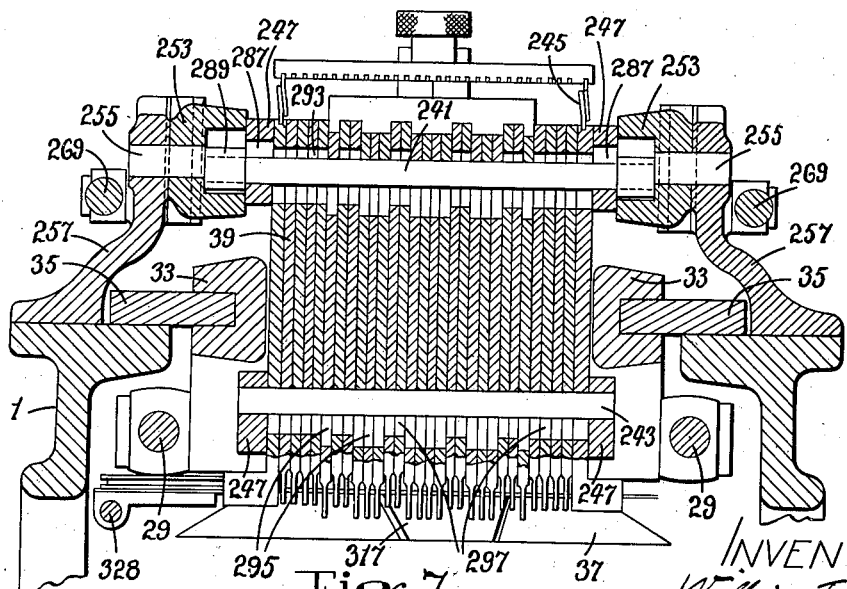

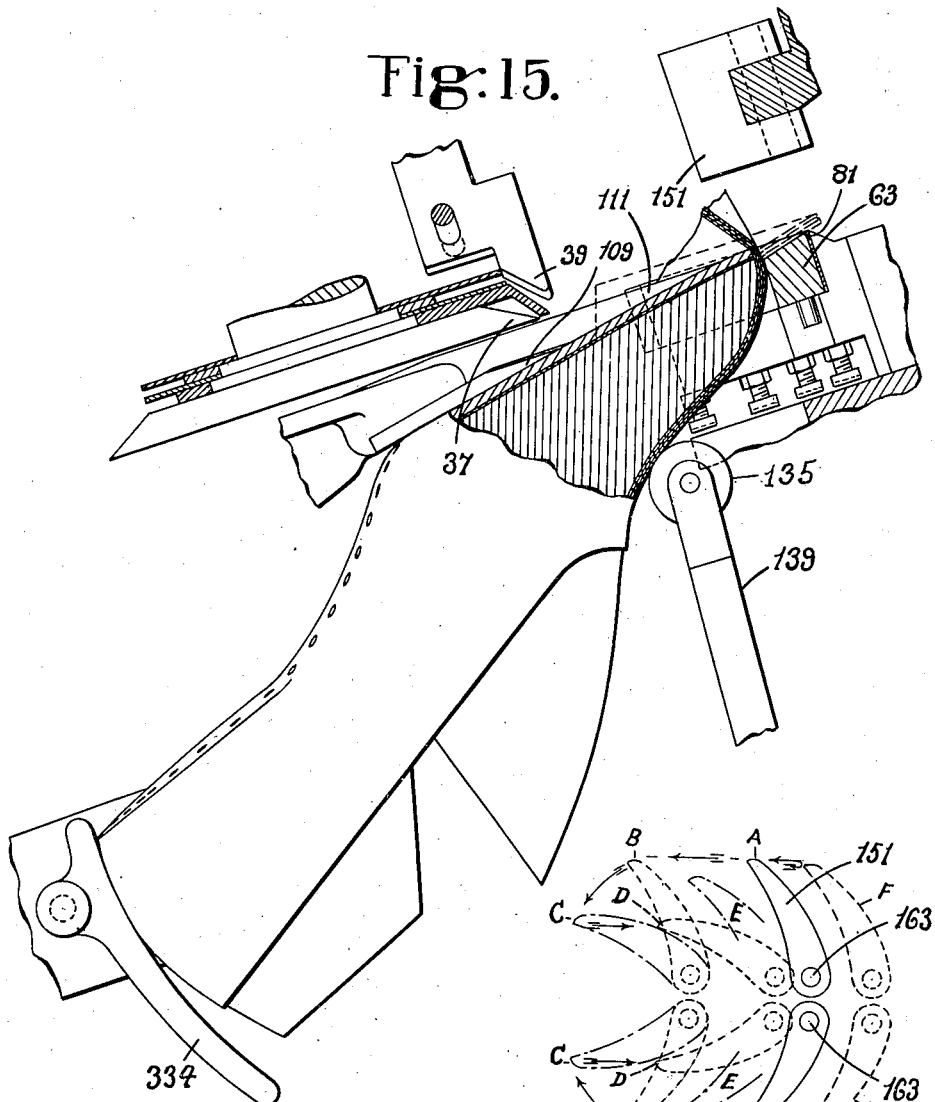

Patented Oct. 28, 1941

2,260,483

UNITED STATES PATENT OFFICE 2,260,483

TRIMMING MACHINE

William Thomas Buckingham Roberts, Leicester, England, assignor to United Shoe Machinery Corporation, Borough of Flemington, N. J., a corporation of New Jersey Application June 4, 1940, Serial No. 338,723
In Great Britain June 23, 1939

10 Claims. (Cl. 12—83.5)

This invention relates to machines for trimming the toe portions of partially fabricated shoes to prepare the lasting margin of an upper for a subsequent toe-lasting operation. The machine herein illustrated as embodying the invention is intended primarily for operating on shoes of the McKay type.

For purposes of this description the term "lasting margin" is intended to include all the layers of material at the toe end where such a margin commonly comprises a layer of outer leather, a lining, a doubler, and a toe box.

A machine of the type herein described is provided with a cutting bed in which a U-shaped recess is formed to receive the toe end of a shoe and on which the lasting margin is spread out while a knife is operated to sever surplus material of the margin with movement from an initial position over the forepart of the shoe in a direction away from the heel end. As the knife travels in the direction specified it severs a strip from all the layers of the outspread lasting margin and may, if the outer leather is too thick, skive some material from the inner surface of that layer. Such a machine is also provided with spreaders arranged to travel across the cutting bed ahead of the knife to spread the lasting margin and to compact it firmly against the bed in preparation for the trimming cut.

One object of the present invention is to provide means for pressing a shoe endwise against the cutting bed with sufficient power to maintain the shoe against dislodgment during the operation of the trimming knife.

Another object is to guard against accidental operation of the machine when no shoe is located as it should be to undergo a trimming operation. The several mechanisms, except those for locating and clamping the shoe, are operated in a certain sequence by cams that derive their motions from a power-driven clutch and, although manual operation is required to locate the shoe and clamp it in the desired position for a trimming operation, a shoe located as aforesaid is necessary to transmit the motion required to trip the clutch.

The invention also comprises other improvements one of which is a cutting bed capable of being adjusted to conform to toe portions of different widths, and another of which is a flexible shearing member combined with the cutting bed to partake of such adjustments.

Referring to the drawings,

Fig. 1 is a right side elevation of the head portion of a machine embodying the present invention, the parts thereof occupying their initial positions;

Fig. 2 is a sectional view from the same side of the machine as Fig. 1 but omitting some of the elements and again representing the included elements in their initial positions;

Fig. 3 is another sectional view and includes mechanisms omitted from Fig. 2;

Fig. 4 is a top plan view of the articulated cutting bed provided with adjusting means by which its effective width may be regulated;

Fig. 5 is a sectional view of the cutting bed in the plane indicated by line V—V in Fig. 4;

Fig. 6 is a sectional view of the assemblage indicated by line VI—VI in Fig. 1;

Fig. 7 is a sectional view of the assemblage indicated by line VII—VII in Fig. 2;

Fig. 8 is a top plan view in a plane slightly above that of the trimming knife (see line VIII—VIII in Fig. 2) and includes the knife, a chip-removing member, and means for operating the latter;

Fig. 9 is a sectional view of the assemblage intersected by line IX—IX in Fig. 8;

Fig. 10 is an elevation and partial section of the structure intersected by line X—X in Fig. 2;

Fig. 11 is a top plan view of an assemblage comprising two individually adjustable gages both arranged to be engaged by the upturned bottom of the forepart of the shoe to determine its level for a trimming operation;

Fig. 12 is a top plan view partly in section (see line XII—XII in Fig. 3) of an assemblage comprising the elements provided to spread the lasting margin and press it against the cutting bed;

Fig. 13 is a front elevation (see broken arrow XIII in Fig. 1) of the clutch assemblage and includes elements of the clutch-controlling mechanism partially represented in section;

Fig. 14 is a view similar to Fig. 13 except that it includes additional elements of the clutch-controlling mechanism;

Fig. 15 is a side elevation, partly in section, of a shoe about to be trimmed by the machine herein described, and located in the desired position by the various elements provided for that purpose; and Fig. 16 is a schematic view from above and represents successive positions of a pair of fingers for spreading and compacting the margins to be trimmed.

The illustrated machine comprises a frame 1 adapted to be supported on a column 3, and having bearings for a clutch shaft 5 and a cam shaft 15. A continuously rotated pulley 7 loosely mounted on the shaft 5 is the driving member of a clutch 11 by which this shaft may be operated. Gears 13 transmit rotation from the shaft 5 to the cam shaft 15 upon which are secured various operating cams including an eccentric 17. This operates an eccentric strap 19 connected to a lever 21 by a pivot pin 23. The lever 21 is mounted at its lower end on a fulcrum pin 25 secured in the machine frame. The upper portion of the lever 21 is forked and has pivoted thereto by pins 27 (only one of which is shown) the rear ends of a pair of rods 29, 29, spaced apart widthwise of the machine. The forward ends of the rods 29, 29, are connected to a cutter carriage 33 by pins 31 (Fig. 2). This carriage is arranged to slide to and fro on guideways 35 (Fig. 7) on the machine frame 1. The guideways 35 are inclined and their rearward ends are higher than their forward ends. The slide 33 carries a circular knife 37 and a work-pressing device comprising a series of resilient fingers 39.

The machine frame 1 (Figs. 1 and 6) has a shelf portion 43 which has a supporting surface 44 the plane of which is parallel with the path of the knife 37. A groove 45 in the portion 43 extends crosswise of the machine. Arranged in the groove 45 is a bar 47, one end of which is bolted to the under surface of a flat plate 49, there being a considerable portion of the bar 47 projecting beyond the right hand side of the plate 49. The plate 49 is of general rectangular outline (Fig. 4) except that its forward side has a recess of a shape similar to that of the toe-portion of a shoe but larger than the largest toe-portion to be operated upon by the machine, this recess providing ample clearance for a shoe to be trimmed in the machine and providing ready access to adjusting screws hereinafter described. The thickness of the bar 47 is such that the under surface of the flat plate 49 secured thereto may bear on the surface 44. The plate 49 carries a cutting bed comprising adjustable articulated blocks and this assemblage may be withdrawn sidewise from its operating position in the machine. When the cutting bed is in the operating position a tongue 51 (Fig. 6) formed on the inner end of the bar 47 projects under a small plate 53 bolted to the machine frame to guard against dislodgment of the assemblage. To the outer end-portion of the bar 47 is secured a small rectangular plate 55, by which the operator may pull out the block assemblage when the retaining screw 57 is removed. This screw extends through the plate 55 and the bar 47 and is screwed into the frame.

The cutting bed (see Fig. 4) comprises a left-hand supporting block 59 and a right-hand supporting block 61 each having one half of a recess which, looked at from above, has a shape corresponding to the general outline of the toe portion of a shoe. Each of the blocks 59 and 61 supports a curved bed block 63 (Fig. 5) and these two bed blocks together provide a U-shaped bed for supporting the outturned lasting margin of a shoe. Each block 63 is loosely connected to the corresponding supporting block by means of a plate 67 and a bolt 69, preferably with a spring washer 71 against each plate. The bolts 69 are secured in the blocks 59 and 61 by set-screws 73. The meeting ends of the blocks 63 have cylindrical male and female formations 75, 77, one of which is nested in the other to form an articulated hinge-joint (Fig. 4) without a connecting pin and without a gap. The axis of this joint coincides with the axis about which the two supporting blocks 59, 61 may be adjusted according to the width of the toe end of a shoe.

Each bed block 63 has a dished surface 79 on which it is intended the lasting margin of a shoe shall be outspread and supported. Between the upstanding confronting surfaces of the supporting blocks 59, 61 and the bed blocks 63 (Fig. 5) is an upstanding flexible steel strip 81, the upper edge of which is arranged to lie in the cutting plane of the knife 37 to provide a shearing edge with which the knife 37 may cooperate. The lower edge of the strip 81 rests on the upper ends of a series of adjusting screws 83 threaded in the blocks 59, 61 and arranged to adjust the strip heightwise. The screws are secured by lock nuts 85.

Each block 59, 61 has an arcuate groove 87 in its bottom surface, the centre of curvature of which coincides with the axis of the hinge joint formed by the members 63. The grooves 87 are occupied by a curved guide bar 89 of similar curvature, which bar 89 is secured to the plate 49 and guides the blocks in an arc when they are being adjusted. Adjusting movement of the parts 59, 61 and 63 is effected by right-and-left screw-threads on a rod 91 having a knob 95 and engaging internally threaded studs 93 pivoted one in each of the parts 59, 61.

The parts 59 and 61 are retained on the supporting plate 49 by a retaining plate 97 and screws 103, the plate 97 being spaced from the supporting plate 49 by cylindrical tubes 99 arranged in slots 101 in the sections 59, 61.

Correct heightwise adjustment of the flexible shearing strip 81 may be obtained from a flat gauge plate 105 (Fig. 6) affixed to a lateral extension 107 of the machine frame 1 on a level with the knife 37 and above the shelf portion 43 of the frame. To adjust the flexible strip 81 the cutting bed assemblage is first placed beneath the gauge plate 105. Then, the screws 83 are adjusted until the upper edge of the strip engages the gauge plate 105, whereupon the screws 83 are locked in position by their locking nuts 85.

To establish the correct heightwise position and slant of the forepart of a shoe bottom relative to the trimming knife 37 the machine is provided with two individually adjustable abutments for engaging the forepart of the shoe bottom, one at the ball portion and the other near the toe end portion of the insole.

The abutment for engaging the ball portion (Figs. 2, 11 and 15) comprises a plate 109 as wide as a forepart and arranged to extend across the lasted side margins, and the abutment for engaging the toe portion of the insole comprises a narrow finger 111 formed on an overlapping plate 113.

The plate 109 is secured to a carrier 115 which is arranged on a rock shaft 117 but not affixed thereto. The shaft is arranged in bearings in the machine frame. The carrier 115 has a downwardly extending lug 119 having an adjusting screw 121 threaded therethrough. A tension spring 123 holds the adjusting screw 121 against a pin 125 fixed in the machine frame 1 to prevent upward displacement of the plate 109. The plate 113 lies just above the plate 109 and is affixed to the shaft 117 to turn therewith. A depending arm 127 is fixed to the shaft 117 and has an adjusting screw 129 threaded in its lower end. A tension spring 133 holds the adjusting screw 129 against a stop face 130 on the frame 1. By means of the adjusting screws 121, 129 the plates 109, 113 can be adjusted individually up and down to determine the slant of the forepart and the heightwise position of a shoe, such adjustments thereby serving to determine the amount of upper material to be severed by the trimming knife 37.

The machine also has a rubber-covered work-supporting roll 135 (see Fig. 1) adapted to be raised into contact with the forepart of the shoe (Fig. 15) near its toe-cap-line while the bottom of the shoe is uppermost. The roll 135 is journaled in a yoke 137 secured in the upper end of a tubular jack-post 139. The latter has telescopic connection with a treadle-rod 145 so connected to a treadle (not shown) as to be raised by depressing the treadle. Upward movement of the rod 145 is transmitted to the post 139 by a compression spring 143 and a pin 141 affixed to the post.

The post 139 is freely movable in a slot 147 formed in a guide-bar 149 and this bar is affixed to the frame 1 with provision for lengthwise adjustment to place the path of travel of the supporting roll wherever desired.

The trimming knife 37 travels from the front toward the rear of the machine to perform the trimming operation but is preceded by a pair of upper-margin spreading fingers 151 that stand initially out of register with the U-shaped recess in the cutting bed as represented in Fig. 3 and Fig. 15, and in their spread relation as represented in Fig. 12. In this position they do not obscure visibility of the work in the recess. When a cycle of operation is initiated by tripping the clutch 11 the fingers 151, now well above the cutting bed, are carried first toward the cutter 37, as a result of which they are placed over the forepart of a shoe but far enough above it to clear the lasting margin that projects above the insole. On reaching this position they are depressed nearly, if not quite, into contact with the insole. Thereafter, the fingers are moved away from the heel end of the shoe and are swung apart to spread the lasting margin over the bed blocks 63.

The means for swinging the spreading fingers 151 includes two operating cams 513 and 511 (Fig. 3) the first of which opens the fingers only far enough to spread the lasting margin on the bed blocks 63 and the other of which opens them to a greater extent thereafter to avoid interference with a group of work-pressing members 39 hereinafter described. The cam 513 cooperates with a roll 503 carried by a bell crank lever 493. The cam 511 cooperates with a roll 509 carried by an arm 502 pivotally mounted on the frame 1. A flat face 505 on the arm 502 cooperates with a roll 501 to communicate upward movement of the arm to a bell crank lever 491. The bell crank levers 491 and 493 are movable about a common axis and are adjustably connected by a screw 517 whereby the roll 503 may be initially adjusted toward and from its cam 513 to regulate the range of spreading motion to be imparted to the spreaders 151 according to the widthwise adjustment of the cutting bed.

The bell crank lever 491 has a pair of upwardly extending arms 495 and these arms are connected respectively with the spreaders 151 by ball-end links 497. After the cam 513 and the roll 503 have opened the spreaders 151 far enough to spread the lasting margin on the cutting bed the spreaders compress the margin and the high portion of the cam 511 thereafter opens the spreaders to a greater extent.

Although the fingers 151 are moved to and fro lengthwise of a shoe by corresponding movements of a carrier 153, they are not directly mounted on this carrier but are mounted on a hinge portion 165 of a carrier 167 to which they are connected by individual pivot pins 163 (Figs. 3 and 12). The carrier 167, in addition to partaking of the to-and-fro movements of the carrier 153, receives individual up-and-down movements by which the fingers 151 are depressed during their travel away from the heel end of a shoe but raised during their travel toward the heel end.

The carrier 153 is mounted in guides 155 (Fig. 6) in the frame 1 and is reciprocated along these guides by means comprising a link 157 and a cam-operated lever 159 (Figs. 1 and 3), the lower end of which is mounted on a fulcrum member 161.

Still referring to Figs. 3 and 12, a carrier 169 is arranged above the carrier 167 and is connected thereto by toggle members 171 and 173, the latter being affixed to a rockshaft 175 that not only provides a pivotal connection with the carrier 169 but also projects therefrom to provide connection with an operating arm 177. These parts are so related that the fingers 151 partake not only of up-and-down movements of the carrier 169, but also of individual up-and-down movements of the carrier 167 produced by operation of the toggle members 171 and 173.

In the course of a cycle the fingers 151 execute the following motions, starting from their initial positions as shown in Fig. 3 and Fig. 15, in which they are spread apart, elevated and at an intermediate point in their travel toward the heel end of a shoe. Referring to Fig. 16, the fingers 151 are represented in successive positions A, B, C, D, E and F. Disregarding the motions of the fingers toward and from the bed blocks 63, the other motions of the fingers are indicated in this figure by arrows. The fingers stand initially at A, A. They first move toward the heel end of a shoe far enough to overhang the forepart of the insole (positions B, B); next, they swing toward each other about their respective pivot pins 163 (C, C); next, they are depressed without engaging the lasting margin of the upper; next, they are shifted away from the heel end of the shoe far enough to bend the lasting margin over the bed blocks 63, 63 (D, D) and at the same time they are spread apart with movement about their pivot pins 163 (E, E) to produce corresponding spreading of the lasting margin (at this stage they may yield upwardly, if necessary, to ride over the out-turned lasting margin); next, they are positively depressed with a movement sufficient to compact the outspread margin and conform it to the upper surface of the bed blocks 63; next, they are raised slightly, opened further and resume their travel away from the heel end of the shoe far enough (F', F') to clear the path of travel of the oncoming trimming knife 37; next, they are raised to their initial plane; and finally, they return to their initial position (A, A) at an intermediate point in their travel toward the heel end of the shoe.

Referring to Fig. 3, the toggle 171, 173 remains broken throughout the travel of the carrier 153 toward the heel end of a shoe and remains straight throughout the travel in the opposite direction, and it is, therefore, straight when the carrier 169 is depressed to compress the outspread lasting margin against the bed blocks 63.

The mechanism for operating these toggle members comprises a rod 179, a spring plate 183 carried thereby, a stationary block 185 that projects between the rod and the spring plate to provide considerable frictional resistance, and a light tension spring 181 by which the toggle is straightened when frictional resistance is removed. The friction block 185 is connected to a supporting bracket by a pin 187. When the carrier 153 is nearest the heel end of a shoe, the spring plate 183 is disengaged from the friction block 185 and the spring 181 then straightens the toggle. The travel of the carrier 153 away from the heel end of the shoe carries the plate 183 along the block 185 and the latter is again clamped with sufficient force to break the toggle when the carrier returns to its initial position.

The carrier 169 is normally depressed by a spring plunger 231 (Fig. 3) that yields to permit the spreaders 151 to ride over the outspread lasting margin on the bed blocks 63. This spring plunger exerts upward force against an adjusting screw threaded in an arm 197 and this arm is rigidly but adjustably connected to an arm 193. Both arms are mounted on a fulcrum pin 195 carried by the carrier 153. The arm 193 projects into a recess 191 in the carrier 169 and is effective to raise and lower the fingers 151 while the toggle 171, 173 is straight. The adjustable connection between the arms 197 and 193 is provided by a forked extension 203 of the arm 193, a block 199, and an eccentric pin 201. This pin has circular bearings in the extension 203 and in the block 199 and the latter has flat bearings in a slot 205 in the arm 197. This connection provides for relative angular adjustment of the arms 197 and 193.

The arm 197 is also utilized to apply the pressure by which the spreaders 151 are positively depressed against the bed blocks 63 after they have been swung apart to spread the lasting margin. For this purpose the machine is provided with a lever 229 (Fig. 1), and an operating cam 131 on the shaft 15. The lever 229 is mounted on a fulcrum rod 215 which also serves as the fulcrum for a connecting lever comprising arms 213 and 217. A slot 209 in the arm 197 and a roll 211 on the arm 213 form an operating connection. The lever 229 and the arm 217 are provided with abutting portions 233 and 235 by which the arm 217 may be moved upwardly, but its downward movement is derived from a screw abutment 239 threaded in an extension 237 of the lever 229. This screw abutment does not act directly on the arm 217 but acts on a pivotal joint by which an arm 223 and a plate 221 are connected. Moreover, the abutments 233 and 239 are so spaced as to afford some lost motion of the lever 229, to the end that the plate 221 may be utilized to grip and release a curved bar 219 carried by the arm 217. The bar 219 occupies an opening formed in the plate 221 for its reception and when the plate 221 is maintained against a stationary abutment 227 by two tension springs 225 as shown in Fig. 1, the bar 219 may slide freely through the plate and thus take any position required of it by the outspread lasting margin on the bed blocks 63. On the other hand, when the screw abutment 239 strikes and depresses the pivotal joint between the arm 223 and the plate 221 the latter becomes canted sufficiently to grip the bar 219 and in consequence thereof it transmits further downward movement of the abutment 239 to the arm 217. The fingers 151 are thus depressed positively to compress the lasting margin.

When the parts of the mechanism last described return to their initial positions the abutments 233 and 235 lift the spreaders 151, and thereafter the plate 221 releases its grip on the bar 219 in consequence of being restored to its seat 227 by the springs 225.

Referring to Figs. 2 and 7, the sliding carriage 33 that carries the trimming knife 37 also carries a group of individually movable work-engaging pressers 39, the function of which is to maintain the outspread lasting margin in contact with the bed blocks 63 after the margin has been conformed to these blocks by the spreaders 151 as hereinbefore described. The pressers 39 are thin, flat plates extending up and down and arranged in face-to-face contact with each other, and their lower extremities engage the work just ahead of the cutting portion of the knife. Each presser is provided with a slot 293 near its upper end to receive a guide rod 241 that extends through and beyond all the pressers of the group. The pressers are also provided with slots near their lower ends through which a guide rod 243 extends, but some of these slots indicated at 295 are longer than those indicated at 297. The pressers having the longer slots may occupy lower positions than those having the shorter slots. This detail of construction provides for counteracting irregularities in the outspread margin of the upper when it is conformed to irregular formations on the bed blocks 63 hereinafter described. The pressers 39 are spring-biased downwardly by individual springs 245 seated on their upper ends and maintained under initial deflection by an adjustable abutment.

The ends of the guide rod 243 are secured in ears formed on a movable plate 247 but the guide rod 241 extends through and beyond slots 287 formed in corresponding ears of the same plate, and their end portions are provided with cam rolls 289 by which the pressers may be raised to clear the thin shearing strip 81 that projects above the bed blocks 63.

Although the knife carriage 33 travels to and fro in a straight path, the plate 247 is capable of a slight individual up-and-down movement and for this purpose the plate is arranged to slide on a flat guide plate affixed to a pillar 249 mounted in the carriage to provide anchorage for the knife 37. The plate 247 is also provided with cam rolls 250 and these are arranged in cam tracks 251 formed in a pair of bars 253, one at each side of the assemblage. The forward ends of the bars 253 are mounted on stationary pivot pins 255, the frame 1 being provided with brackets 257 to which these pivots are affixed. The rear ends of the bars 253 may be moved up and down by toggles each comprising links 261 and 263 connected by a pivot pin 265 at the knee of the toggle. The links 261 are connected to the brackets 257 by anchor pivots 259. The construction is such that when the toggles are straight, as shown in Fig. 2, the bars 253 occupy their lower positions but when the toggles are broken the bars are slightly raised thereby. Each knee pivot 265 is provided with a bearing block 279 in which a hole is bored to provide a bearing for an operating rod 275. These rods are capable of sliding endwise through the blocks 279 and are provided with shoulders 277 and nuts between which the blocks are located. The rods are moved to and fro through the blocks 279 by the knife carriage 33 and for this purpose the forward ends 269 of the rods are connected by pivots 271 with members 273 affixed to the carriage.

When the cutting stroke of the knife 37 is nearly but not quite completed, that is, after its cutting edge has traveled beyond the stationary shearing strip 81, the shoulders 277 break the toggles and thereby raise the pressers 39 far enough to insure their clearing the trimmed lasting margin during their return movement to their initial position. Just before this return movement is completed the nuts 281 strike the blocks 279 and thereby straighten the toggles to depress the bars 253 for the next trimming operation.

When the knife carrier 33 is at an intermediate point in its cutting stroke, that is, at a point where the pressers 39, or some of them, might strike the stationary shearing strip 81 in the absence of shoe material to cover the strip, the rolls on the ends of the guide bar 241 encounter supplemental cams 291 on the bars 253 and are thereby raised far enough to carry the pressers over the strip.

For some kinds of work, particularly men's shoes in which the upper materials are comparatively thick, it is desirable, when trimming the outspread toe margins thereof, to trim them in such a way as to avoid uneven thickness when these materials are subsequently turned inwardly upon the insole and pleated in the toe-lasting operation. Accordingly, for such work the margin-supporting surfaces of the bed blocks 63 may be provided with a series of ridges or lands 283 (Figs. 4 and 6) between which cavities or depressions are provided to receive segments of an outspread lasting margin. The spreaders 151 will depress these segments into these cavities and some of the pressers 39 will maintain the segments so depressed, but the portions of the margin that lie on the lands 283 will be supported at a level above the depressed segments with the result that these higher portions will be skived to less thickness than the depressed segments. Moreover, all portions of an outspread margin that overlap the shearing strip 81 will be completely severed on a line established by the curvature of that strip.

Referring to Figs. 2, 8 and 9, a chip-clearing member 317 is arranged to swing to and fro in the space between the pressers 39 and the cutting segment of the knife 37. This member is formed on a ring 311 seated on the upper surface of the knife and maintained in concentric relation thereto by a concentric shoulder 301 formed on the lower end of the pillar 249 to which the knife is anchored. Two pins connect the ring 311 and a ring 309 and extend through segmental slots 315 in an interposed plate 303. Although the rings 309 and 311 may oscillate as one, the plate 303 and an upper plate 305 do not partake of such oscillation. The ring 309 bears on a shoulder 299 on the pillar 249. One end of a flexible cable 323 is attached to the ring 309 and is wrapped around a segment of its periphery from which it extends around a segment of a sheave 321 and thence to an anchoring block 327. In like manner, another flexible cable 325 is attached to the disk 309 and extends in the opposite direction around a segment thereof and thence around a segment of the sheave 321, its outlying end being fastened to an anchoring block 329. The blocks 327 and 329 are affixed to a stationary rod 328. The plates 303 and 305 are affixed to members 307, these members are arranged to slide on the rod 328, and the sheave 321 is carried by a pivot pin 319 secured to these plates. The mechanism last described translates the to-and-fro motions of the knife carriage 33 into oscillatory motions of the chip-clearing member 317.

When a shoe has been placed in the desired position for a trimming operation the operator, after depressing the treadle that lifts the jackpost 139, will raise a hand lever 9 (Figs. 1 and 2). This lever and a member 333 are rigidly connected to each other and both are mounted on the fulcrum shaft 161. The first effect of raising the lever 9 is to shift a clamping member 334 against the heel end of the shoe (Fig. 15) and thereby force the toe end of the shoe against the bed blocks 63. The upward movement of the lever 9 is communicated to an arm 349 by a resilient connection afforded by a spring plunger 375 which is carried by a rigid arm 373 of the member 333. The plunger 375 abuts against a lug 367 formed on the arm 349. The arm 373 is provided with an internally threaded socket in which an adjusting screw 377 is arranged and this screw is bored to provide a socket for a compression spring and a bearing in which the plunger 375 may slide. The opposite side of the arm 349 is thus maintained initially against an abutment 369 formed on the arm 373. The applied force of the spring plunger 375 may be regulated by turning the screw 377 and any position of regulation may be maintained by providing the head 379 of the screw with grooves 381 to receive a conical point formed on a spring follower 383 that projects from the member 333.

The arm 349 is also mounted on the shaft 161 and the motion of the arm is communicated by a link 351 to a carrier 353. This carrier (see Fig. 10) has tongue-and-groove connection with a guiding member affixed to the frame 1. The clamping member 334 has tongue-and-groove connection 355 with the carrier 353 and may be located at any one of three positions along the length of its carrier to provide for shoes of different lengths. The clamping member 334 is bored and provided with a spring-biased locking pin 363 and the carrier 353 is provided with a series of three holes 365 to receive the pin.

Assuming that a shoe has been clamped by the means above described and that upward movement of the hand lever 9 is continued after the travel of the clamping member 334 is arrested by the shoe, the next result is that the clutch 11 is tripped to start automatic operation of the machine. Such tripping will not be possible unless a shoe is present to arrest the travel of the clamping member 334 because mechanism now about to be described will not function unless the clamping member is arrested before the upward movement of the lever 9 is terminated. For this purpose, a pawl 337 is mounted on a pivot pin 335 carried by the member 333. This pawl may engage any one of a series of teeth formed on a member 339 affixed to a portion 341 of a U-shaped rocker 343, both arms of which are mounted on the shaft 161. A spring plunger 391 carried by the member 333 engages the back of the pawl 337 to swing the latter toward the teeth of the member 339 but the pawl is initially displaced from its operative position by an abutment 385 affixed to a portion 387 of the arm 349. The pawl may, therefore, travel past some of the teeth of the member 339 until the shoe-clamping member 334 is arrested, but at this stage the abutment 385 will be arrested while the pawl continues to move. A cavity 389 in the pawl now receives the abutment 385 and the tip of the pawl becomes lodged between two teeth of the member 339. Further upward movement of the hand lever 9 is communicated to the rocker 343 by the pawl, whereupon the rocker becomes effective to trip the clutch 11. The details of the tripping mechanism are hereinafter described.

Assuming that automatic operation of the machine has been initiated in consequence of tripping the clutch, a cam 397 carried by the cam shaft 15 (Fig. 2) operates a lever 395 loosely mounted on the shaft 161. The purpose of this lever is to increase the force of the clamping member 334 against the heel end of hte shoe without necessarily imparting any supplemental movement to the clamping member. The supplemental force will clamp the shoe so firmly that it may not be accidentally dislodged while the machine is in operation.

For the purpose last mentioned, a plunger 399 is pivotally connected to the free end of the lever 395 and extends loosely through a bore in a stud 401 that provides a bearing for it. To provide a resilient force against the stud 401 a compression spring 409 is arranged to surround the plunger 399. A collar 411 loosely surrounding the plunger is located between the spring and a flat face 413 formed on the stud. The opposite end of the spring abuts a nut 405 backed by a lock nut 407 both of which engage a screw-thread on the plunger and provide for regulating the initial defleciton of the spring. In addition to extending through the stud 401 the plunger also extends through a collar 417 that is retained on the plunger by a nut 420.

The stud 401 is rotatably mounted in a forked arm 408 of a lever that also comprises a rounded end 423. A bracket 421 bolted to the frame 1 supports a fulcrum pin 415 on which the lever 408, 423 is mounted.

Movement of this lever is communicated to a bar 425 having jaws with which the rounded end 423 cooperates. The bar 425 is arranged to slide in bearings in the carrier 353 (Fig. 10), and is provided with a pawl 429 by which its motion or the stress of the spring 409 may be communicated to the clamping member 334. The pawl 429 is arranged in an opening 427 in the bar 425 and is biased by a spring-plunger 431. A plate 433 affixed to the carrier 353 is provided with a series of teeth any one of which may be engaged by the pawl, but when the bar 425 occupies its initial position the pawl is disengaged from the toothed plate 433 by a stationary shield 435.

The mechanism last described operates as follows: The clamping movement imparted to the heel-engaging member 334 by the handle 9 will locate one of the teeth of the plate 433 slightly to the right of the right-hand edge of the shield 435, the particular tooth thus located being governed by the length of the shoe. Thereafter, when the bar 425 is shifted to the right by the cam 397 in pursuance of tripping the clutch 11, the pawl 429 will travel beyond the right-hand edge of the shield 435 and engage the tooth located as aforesaid. At this stage the bar 425 and the carrier 353 will be coupled by the pawl and the toothed plate to impart supplemental clamping movement to the member 334 or merely to develop supplemental clamping force, as the case may be.

Although the ratio of the transmission gears 13 requires the clutch shaft 5 to rotate at a faster rate of speed than the cam shaft 15, the clutch-controlling mechanism about to be described is governed by the rotation of the cam shaft to stop the operation of the machine at the termination of one revolution of this shaft.

Referring to Fig. 1, a two-armed lever 347 is carried up and down by an arm 345 of the rocker 343 to which it is connected by a pivot pin. The upper arm of the lever 347 is arranged to be displaced by a knock-off cam 469 affixed to the shaft 15 and the lower arm thereof is effective to trip the clutch 11. A shoulder of the lower arm initially overlies a steel plate 461 secured to an arm 459 of a lever that also includes an arm 455 (see Figs. 13 and 14). A stud 457 carried by the arm 455 is arranged to depress an arm 458 to trip the clutch. The arm 458 and a toggle member 447 are rigidly connected and are affixed to a rockshaft 453. This rockshaft is arranged in bearings provided by a portion of a clutch casing 439 bolted to the machine frame 1. The casing 439 also provides a bearing for a pivot member 451 on which the lever 455, 459 is mounted. These parts initially occupy the positions shown in the drawings, in which the toggle member 447 and a cooperative toggle member 445 are maintained in their straight relation as shown in Fig. 13 to hold the clutch out of operation. The toggle member 445 is seated in a clutch-controlling member 441 suspended from a fulcrum pin 443 in the casing 439. The interior construction of the clutch is well known and for that reason its details of construction are not herein illustrated. The construction is such that when the toggle is straight the clutch is disengaged but when the knee of the toggle is depressed the member 441 will swing about its supporting pivot 443 to engage the clutch. The toggle is normally maintained in its straight position by the upward pull of a tension spring 449, the lower end of which is attached to an arm rigidly connected to the toggle member 447 by the rockshaft 453.

When a shoe is correctly positioned in the machine to cause actuation of the rocker 343 in consequence of raising the handle 9, the described connections depress the knee of the toggle 445, 447, whereupon the clutch 11 is set in operation and rotation of the cam shaft 15 is initiated. The starting movement of the arm 459 permits a rod 463 to descend by the force of gravity. This rod stands on the plate 461 and is arranged to slide in bearings 465 formed on the casing 439. The purpose of this rod is to prevent the toggle 445, 447 from returning to its straight position until the cam shaft 15 has completed one revolution. A roll at the upper end of the rod 463 is arranged to be engaged by a cam 467, the periphery of which is concentric with the exception of a depression therein. Once the cam has turned far enough to carry its concentric portion into engagement with the roll the operator need no longer keep hold of the handle 9. In due course, the cam 469 will displace the lever 347 to disengage the lower arm thereof from the plate 461, but the rod 463 and the cam 467 will continue to maintain the arm 459 in its depressed position until the depression in the cam is brought into register with the rod (Fig. 1) whereupon the spring 449 (Fig. 13) will straighten the toggle 445, 447 to disengage the clutch.

Having described my invention, what I claim as new and desire to secure by Letters Patent of the United States is:

1. A trimming machine comprising a cutting bed having a U-shaped recess to receive the toe end of a partially fabricated shoe of which the lasting margin at that end is unsecured, shoe-clamping means arranged to operate against the heel end of the shoe to press the shoe endwise against the wall of said recess, power-operated mechanism arranged to spread said lasting margin on said cutting bed and power-operated cutting mechanism arranged to cooperate with said cutting bed to sever surplus material from said margin.

2. A trimming machine comprising a cutting bed having a U-shaped recess to receive the toe end of a partially fabricated shoe of which the lasting margin at that end is unsecured, shoe-clamping means arranged to operate against the heel end of the shoe to press the shoe endwise against the wall of said recess, said clamping means including relatively movable parts and resilient means by which their clamping effect is applied to the shoe, a power-operated clutch, mechanism operable by said clutch to spread said margin on said bed, mechanism operable by said clutch to sever surplus material from said margin, and means operable by said clamping means to initiate operation of said clutch in consequence of relative movement of said parts produced by clamping a shoe.

3. A trimming machine comprising a cutting bed having a U-shaped recess to receive the toe end of a partially fabricated shoe of which the lasting margin at that end is unsecured, a clamping member arranged to engage the heel end of a shoe, manually operable means by which said clamping member may be shifted to press the shoe endwise against the wall of said recess, a power-driven clutch, mechanism operable by said clutch to apply supplemental pressure of said clamping member against the shoe, mechanism operable by said clutch to spread said margin on said bed, and cutting mechanism operable by said clutch to sever surplus material from said margin.

4. A trimming machine comprising a cutting bed having a U-shaped recess to receive the toe end of a partially fabricated shoe of which the lasting margin at that end is unsecured, a plurality of gaging elements arranged to be engaged by the forepart of the bottom of a shoe to locate that part of the shoe heightwise in a predetermined relation to said cutting bed, means arranged to support the forepart of the shoe with pressure against said gaging elements, mechanism arranged to spread said margin on said bed, and cutting mechanism arranged to sever surplus material from said margin with movement away from the heel end of the shoe.

5. A trimming machine comprising a cutting bed having a U-shaped recess to receive the toe end of a partially fabricated shoe of which the lasting margin at that end is unsecured, spreaders arranged to spread said margin on said bed, power-driven mechanism arranged to operate said spreaders first with movement toward the heel end of the shoe and thereafter with movement in the opposite direction, and power-driven cutting mechanism arranged to sever surplus material from said margin with movement away from the heel end of the shoe.

6. In a toe-trimming machine of the type in which a knife is operated with movement away from the heel end of a partially fabricated shoe to sever surplus material from the lasting margin at the toe end, a series of relatively adjustable blocks having male and female formations nested one in another to provide an articulated cutting bed and forming a U-shaped recess to receive said toe end, means by which said blocks may be adjusted to regulate the width of said recess, mechanism arranged to spread said lasting margin on said blocks, and power-driven means arranged to operate said knife.

7. In a toe-trimming machine of the type in which a knife is operated with movement away from the heel end of a partially fabricated shoe to sever surplus material from the lasting margin at the toe end, articulated blocks forming a U-shaped cutting bed and a U-shaped recess to receive said toe end, articulated supported blocks forming a U-shaped recess in which said bed blocks are nested, means by which said blocks may be adjusted to regulate the width of said recesses, and a thin flexible strip of steel lying between said bed blocks and said supporting blocks to partake of their width regulation, said strip having a U-shaped shearing edge arranged to cooperate with said knife in the severing operation.

8. A trimming machine comprising a frame, an abutment affixed thereto and having a gaging surface, a U-shaped cutting bed, a U-shaped shearing blade in which said cutting bed is nested, movable means by which said cutting bed and said shearing blade are maintained in assembled relation, said means being arranged on a portion of said frame to provide for shifting said shearing blade alternatively to a position in register with said abutment and to an operative position, cutting mechanism having a knife movable across said cutting bed and said shearing blade, and adjusting means carried by said movable means to adjust said shearing blade with edgewise movement against said gaging surface.

9. A trimming machine comprising a cutting bed having a U-shaped recess to receive the toe end of a partially fabricated shoe of which the lasting margin at that end is unsecured, cutting mechanism having a knife arranged to sever surplus material from a lasting margin spread on said cutting bed, spreaders arranged to spread said margin on said bed, two interconnected mechanisms each arranged to shift said spreaders toward and from the plane of said bed, one of said mechanisms having a toggle to furnish a component of such shifting movement, and means by which said interconnected mechanisms are operated successively to advance the spreaders toward said plane in successive stages.

10. A trimming machine comprising a cutting bed having a U-shaped recess to receive the toe end of a partially fabricated shoe of which the lasting margin is unsecured at that end, mechanism arranged to spread said margin on said cutting bed, cutting mechanism having a knife arranged to travel across said cutting bed to sever surplus material from the outspread margin lying thereon, a group of individually yieldable pressers carried by said cutting mechanism and arranged to travel ahead of said knife to press the outspread margin against said cutting bed, means arranged to locate the work-engaging portions of some of said pressers in more advanced positions than others, and means arranged to retract the more advanced pressers from said cutting bed while they are traveling thereover.

WILLIAM THOMAS
BUCKINGHAM ROBERTS.

CERTIFICATE OF CORRECTION.

Patent No. 2,260,483.  October 28, 1941.

WILLIAM THOMAS BUCKINGHAM ROBERTS.

It is hereby certified that error appears in the printed specification of the above numbered patent requiring correction as follows: Page 7, second column, line 15, claim 7, for "supported" read --supporting--; and that the said Letters Patent should be read with this correction therein that the same may conform to the record of the case in the Patent Office.

Signed and sealed this 23rd day of December, A. D. 1941.

Seal)

Henry Van Arsdale,
Acting Commissioner of Patents.